United States Patent
Hu et al.

(10) Patent No.: US 12,360,589 B2
(45) Date of Patent: Jul. 15, 2025

(54) ESTIMATION OF FORCE APPLIED BY A FINGER BASED ON WRIST SURFACE TOPOGRAPHY

(71) Applicant: DOUBLEPOINT TECHNOLOGIES OY, Helsinki (FI)

(72) Inventors: Jamin Hu, Espoo (FI); Eemil Visakorpi, Espoo (FI); Lauri Tuominen, Helsinki (FI); Ville Klar, Helsinki (FI); Felix Bade, Helsinki (FI)

(73) Assignee: DOUBLEPOINT TECHNOLOGIES OY, Helsinki (FI)

( * ) Notice: Subject to any disclaimer, the term of this patent is extended or adjusted under 35 U.S.C. 154(b) by 0 days.

(21) Appl. No.: 18/560,892

(22) PCT Filed: May 18, 2022

(86) PCT No.: PCT/FI2022/050333
§ 371 (c)(1),
(2) Date: Nov. 14, 2023

(87) PCT Pub. No.: WO2022/243602
PCT Pub. Date: Nov. 24, 2022

(65) Prior Publication Data
US 2024/0248529 A1    Jul. 25, 2024

(30) Foreign Application Priority Data
May 18, 2021    (FI)  .................................... 20215589

(51) Int. Cl.
*G06F 3/01*      (2006.01)
*G04G 21/02*      (2010.01)
(Continued)

(52) U.S. Cl.
CPC ............. *G06F 3/011* (2013.01); *G04G 21/02* (2013.01); *G06F 3/0304* (2013.01); *G06F 3/0346* (2013.01); *G06F 3/038* (2013.01)

(58) Field of Classification Search
CPC ...................................... G06F 3/011
See application file for complete search history.

(56) References Cited

U.S. PATENT DOCUMENTS

| 9,170,674 | B2 | 10/2015 | Forutanpour et al. |
| 9,367,793 | B2 | 6/2016 | Proud et al. |

(Continued)

FOREIGN PATENT DOCUMENTS

| EP | 3 203 350 A1 | 8/2017 |
| EP | 3 518 075 A1 | 7/2019 |

(Continued)

OTHER PUBLICATIONS

Elisa Morganti et al., "A Smart Watch With Embedded Sensors to Recognize Objects, Grasps and Forearm Gestures," Procedia Engineering, 41:1169-1175, (2012).

(Continued)

*Primary Examiner* — Gustavo Polo
(74) *Attorney, Agent, or Firm* — ALSTON & BIRD LLP

(57) ABSTRACT

Devices, methods and computer programs for estimation of force applied by a finger based on wrist surface topography are disclosed. A computing unit (200A, 200B) receives, from a group of proximity sensors (300) mounted on an inner surface of a wristband (111) of a wrist apparatus (110A, 110b) communicatively connected to the computing unit (200A, 200B), a detected proximity of each proximity sensor (300) to a wrist surface of a user wearing the wristband. The computing unit (200A, 200B) measures changes in wrist surface topography based on the detected proximities, and estimates a force applied on a surface by at (Continued)

least one finger associated with the wrist based on the measured changes in the wrist surface topography.

14 Claims, 7 Drawing Sheets

(51) Int. Cl.
*G06F 3/03* (2006.01)
*G06F 3/0346* (2013.01)
*G06F 3/038* (2013.01)

(56) References Cited

U.S. PATENT DOCUMENTS

| | | | |
|---|---|---|---|
| 9,592,007 | B2 | 3/2017 | Nuovo et al. |
| 10,248,200 | B2 | 4/2019 | Cohen et al. |
| 2010/0066664 | A1 | 3/2010 | Son et al. |
| 2017/0045946 | A1 | 2/2017 | Smoot et al. |
| 2017/0090590 | A1 | 3/2017 | Shimotono et al. |
| 2017/0269697 | A1 | 9/2017 | Vaughn et al. |
| 2017/0285744 | A1 | 10/2017 | Juliato |
| 2018/0047234 | A1 | 2/2018 | Hyde et al. |
| 2018/0143697 | A1 | 5/2018 | Kim et al. |
| 2018/0303383 | A1 | 10/2018 | Connor |
| 2018/0307314 | A1* | 10/2018 | Connor .................. G06F 3/017 |
| 2018/0348880 | A1 | 12/2018 | Juliato |
| 2021/0124417 | A1 | 4/2021 | Ma |

FOREIGN PATENT DOCUMENTS

| | | |
|---|---|---|
| WO | WO 2011/055326 A1 | 5/2011 |
| WO | WO 2015/033327 A1 | 3/2015 |
| WO | WO 2015/199747 A1 | 12/2015 |
| WO | WO 2017/075611 A1 | 5/2017 |
| WO | WO 2019/095050 A1 | 5/2019 |

OTHER PUBLICATIONS

Finnish Search Report received for Finnish U.S. Appl. No. 20/215,589, mailed Aug. 24, 2021, 2 pages.

International Search Report for International Application No. PCT/FI2022/050333, mailed Aug. 30, 2022, 4 pages.

Written Opinion for International Application No. PCT/FI2022/050333, mailed Aug. 30, 2022, 7 pages.

* cited by examiner

ESTIMATION OF FORCE APPLIED BY A FINGER BASED ON WRIST SURFACE TOPOGRAPHY

CROSS-REFERENCE TO RELATED APPLICATIONS

The present application is a national phase entry of International Application No. PCT/FI2022/050333, filed May 18, 2022, which claims priority to Finnish Application No. 20215589, filed May 18, 2021, which is incorporated herein by reference in its entirety.

TECHNICAL FIELD

The disclosure relates generally to wearable devices and, more particularly but not exclusively, to estimation of force applied by a finger based on wrist surface topography.

BACKGROUND

Traditionally, digital devices have been controlled using a dedicated physical controller. For example, a computer can be operated with a keyboard and mouse, a game console with a handheld controller, and elevators with elevator buttons. Usually, these physical controllers comprise sensors and/or buttons for receiving inputs from the user based on the user moving the interface device or pressing buttons. But, this means that for each digital device produced, a dedicated and exclusive user interface with buttons needs to be produced.

To save manufacturing time and resources, as well as saving the user from owning numerous input devices, there have been numerous attempts to create a universal input device that could be used to control all digital devices. Currently, the closest solution to such a device is a smart phone. For example, the smartphone enables manufacturers of electric scooters to not include any user input buttons on the scooter itself but have most of the human computer interaction occur through the smartphone. This, however, has a major drawback which is that users using their phones need to hold their phones with their hands, in effect immobilizing their hands to perform other activities. Furthermore, the amount of physical space that is available for user input is also small compared to a traditional computer keyboard, for example.

Other solutions that are less mainstream but don't immobilize the hand include smart gloves that users can wear to sense where, when, and how they press on surfaces around them while not obstructing the movement of the hand. The major drawback here is that although hand movement isn't obstructed, the hand's sense of touch is obstructed. This can make operating many digital devices too cumbersome.

Accordingly, there is a need for a device that could, for example, estimate the amount of force a user uses to press on a surface, in order to control a virtual version of any device that can be actuated by applying force to it, e.g., by pressing it. The force would need to be sensed and estimated in a way that would not obstruct the natural movement of the user's hand nor the sense of touch.

One technology that has been proposed traditionally is wrist-based electromyography (EMG). By detecting the electrical activity of the user's wrist/forearm through a wrist worn device, the user's force being applied with their fingers could be estimated. However, there are significant drawbacks to EMG, including poor signal-to-noise ratio at the wrist, difficulty of maintaining optimum contact to the skin, high computational resource requirements, and sensitivity to sensor placement.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a system comprises a wrist apparatus and a computing unit communicatively connected to the wrist apparatus. The wrist apparatus comprises a wristband. The wrist apparatus further comprises a group of at least two proximity sensors mounted on an inner surface of the wristband and configured to detect a proximity of each proximity sensor to a surface of a wrist of a user wearing the wristband. The computing unit comprises at least one processor, and at least one memory that includes computer program code. The at least one memory and the computer program code are configured to, with the at least one processor, cause the computing unit to at least perform measuring changes in wrist surface topography based on the detected proximities, and estimating a force applied on a surface by at least one finger associated with the wrist based on the measured changes in the wrist surface topography.

In an example embodiment, alternatively or in addition to the above-described example embodiments, the group of the at least two proximity sensors comprises at least one row of the proximity sensors in the direction of the circumference of the inner surface of the wristband.

In an example embodiment, alternatively or in addition to the above-described example embodiments, the group of the at least two proximity sensors comprises one or more of: an infrared based proximity sensor, a laser based proximity sensor, an electronic image sensor based proximity sensor, an ultrasound based proximity sensor, a capacitive proximity sensor, a radar based proximity sensor, an accelerometer based proximity sensor, a piezoelectricity based proximity sensor, or a pressure based proximity sensor.

In an example embodiment, alternatively or in addition to the above-described example embodiments, the infrared based proximity sensor comprises a pair of an infrared light-emitting diode acting as an infrared light emitter and a phototransistor acting as an infrared light receiver.

In an example embodiment, alternatively or in addition to the above-described example embodiments, the at least one memory and the computer program code are further configured to, with the at least one processor, cause the computing unit to perform outputting a force signal indicating the estimated force.

In an example embodiment, alternatively or in addition to the above-described example embodiments, the computer program code comprises a neural network trained to perform the estimating of the force applied on the surface.

In an example embodiment, alternatively or in addition to the above-described example embodiments, the wrist apparatus further comprises one or more inertial measurement unit sensors mounted on the wristband, configured to provide position information of the wristband for the training of the neural network.

In an example embodiment, alternatively or in addition to the above-described example embodiments, the group of the at least two proximity sensors comprises an infrared based proximity sensor, and the at least one memory and the computer program code are further configured to, with the at least one processor, cause the computing unit to perform adjusting at least one of brightness of an infrared light emitter of the infrared based proximity sensor or sensitivity of an infrared light receiver of the infrared based proximity sensor.

In an example embodiment, alternatively or in addition to the above-described example embodiments, the computing unit is integrated in the wrist apparatus.

In an example embodiment, alternatively or in addition to the above-described example embodiments, the wrist apparatus comprises a smart watch.

In an example embodiment, alternatively or in addition to the above-described example embodiments, the computing unit is external to the wrist apparatus.

An example embodiment of a computing unit comprises at least one processor, and at least one memory that includes computer program code. The at least one memory and the computer program code are configured to, with the at least one processor, cause the computing unit to at least perform receiving, from a group of at least two proximity sensors mounted on an inner surface of a wristband of a wrist apparatus communicatively connected to the computing unit, a detected proximity of each proximity sensor to a surface of a wrist of a user wearing the wristband; measuring changes in wrist surface topography based on the detected proximities; and estimating a force applied on a surface by at least one finger associated with the wrist based on the measured changes in the wrist surface topography.

In an example embodiment, alternatively or in addition to the above-described example embodiments, the at least one memory and the computer program code are further configured to, with the at least one processor, cause the computing unit to perform outputting a force signal indicating the estimated force.

In an example embodiment, alternatively or in addition to the above-described example embodiments, the computer program code comprises a neural network trained to perform the estimating of the force applied on the surface.

In an example embodiment, alternatively or in addition to the above-described example embodiments, the group of the at least two proximity sensors comprises an infrared based proximity sensor, and the at least one memory and the computer program code are further configured to, with the at least one processor, cause the computing unit to perform adjusting at least one of brightness of an infrared light emitter of the infrared based proximity sensor or sensitivity of an infrared light receiver of the infrared based proximity sensor.

In an example embodiment, alternatively or in addition to the above-described example embodiments, the computing unit is integrated in the wrist apparatus.

In an example embodiment, alternatively or in addition to the above-described example embodiments, the computing unit is external to the wrist apparatus.

An example embodiment of a method comprises receiving, at a computing unit from a group of at least two proximity sensors mounted on an inner surface of a wristband of a wrist apparatus communicatively connected to the computing unit, a detected proximity of each proximity sensor to a surface of a wrist of a user wearing the wristband. The method further comprises measuring, by the computing unit, changes in wrist surface topography based on the detected proximities. The method further comprises estimating, by the computing unit, a force applied on a surface by at least one finger associated with the wrist based on the measured changes in the wrist surface topography.

In an example embodiment, alternatively or in addition to the above-described example embodiments, the method further comprises outputting, by the computing unit, a force signal indicating the estimated force.

In an example embodiment, alternatively or in addition to the above-described example embodiments, a neural network trained to perform the estimating of the force applied on the surface.

In an example embodiment, alternatively or in addition to the above-described example embodiments, the group of the at least two proximity sensors comprises an infrared based proximity sensor, and the method further comprises adjusting, by the computing unit, at least one of brightness of an infrared light emitter of the infrared based proximity sensor or sensitivity of an infrared light receiver of the infrared based proximity sensor.

An example embodiment of a computer program comprises instructions for causing a processor to perform at least the following:
  receiving, from a group of at least two proximity sensors mounted on an inner surface of a wristband of a wrist apparatus communicatively connected to the computing unit, a detected proximity of each proximity sensor to a surface of a wrist of a user wearing the wristband;
  measuring changes in wrist surface topography based on the detected proximities; and
  estimating a force applied on a surface by at least one finger associated with the wrist based on the measured changes in the wrist surface topography.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In the following, various example embodiments will be discussed. At least some of these example embodiments may allow measuring changes in wrist surface topography (i.e. changes in a cross-sectional perimeter of the wrist) based on proximities detected by proximity sensors (e.g. infrared based proximity sensors) and then using this information about the wrist surface topography changes to estimate a force applied on a surface (e.g. a table or the like) by a finger associated with e.g. wrist. In other words, the disclosed embodiments measure surface changes of the wrist rather than an internal cross-sectional structure of the wrist. Information about the estimated force can then be utilized in various applications.

When a force is applied by a hand on a surface, the mechanical structure of the wrist changes in response to the tendons changing tension in order to apply that force. This changes the cross-sectional area and shape of the wrist. In other words, when sensing the cross section externally, it can be thought of as "wrist topography" changing. Depending on, e.g., which fingers are used, how much force is applied, what position the hand is in, and other variables, different measurable wrist topographies may form. By measuring the topography at a high enough resolution, such as using a matrix of active infrared proximity sensors in a wristband placed on the wrist of the user, the force applied by the user may be determined. These measurements may be taken continuously to provide real-time force predictions for each finger incorporated (at least in some embodiments, in combination with other input methods) into various different input commands for digital devices.

Figure 1:
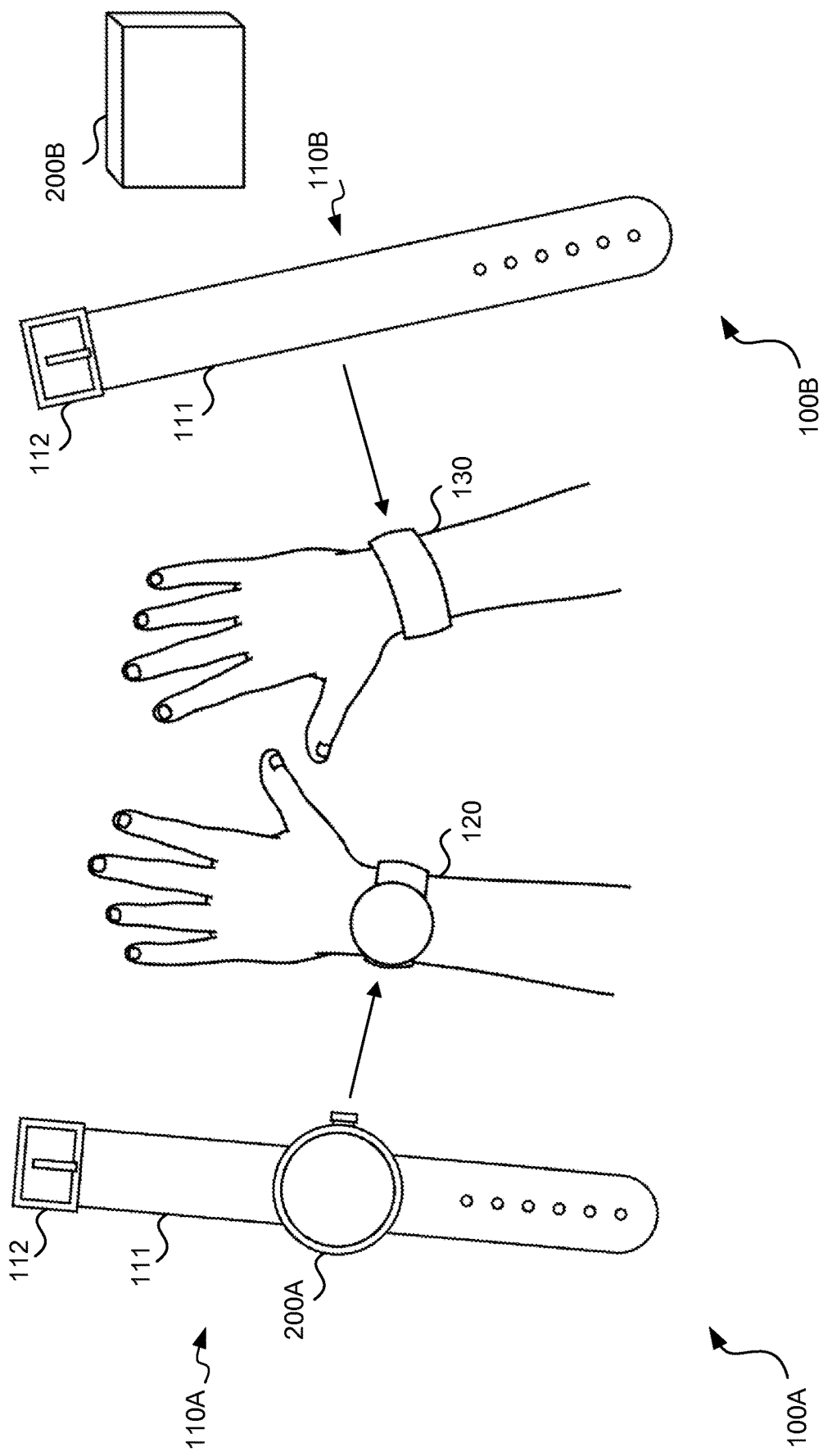
FIG. 1 shows an example embodiment of the subject matter described herein illustrating example systems, where various embodiments of the present disclosure may be implemented.

FIG. 1 illustrates example systems 100A and 100B, where various embodiments of the present disclosure may be implemented. In system 100A a computing unit 200A is integrated in a wrist apparatus, whereas in system 100B a computing unit 200B is external to the wrist apparatus. In another embodiment, the computing unit 200A may be used both in system 100A (as an integrated one) and in system 100B (as an external one). In yet another embodiment, the computing unit 200B may be used both in system 100A (as an external one) and in system 100B (as an external one).

In the example embodiment of FIG. 1, the user may wear the wrist apparatus 110A on one wrist 120 and the wrist apparatus 110B on the other wrist 130, thus allowing estimation of force applied by all ten fingers. In other embodiments, the user may wear a single wrist apparatus on a single hand, thus allowing estimation of force applied by one or more fingers of that single hand. In other words, the disclosed embodiments may be included, e.g., in a standalone wristband or in a pair of wristbands.

Both systems 100A, 100B comprise a wrist apparatus (110A, 110B, respectively) and a computing unit 200A, 200B that is communicatively connected to the wrist apparatuses 110A, 110B. Both of the wrist apparatuses 110A, 110B comprise a wristband 111. The wristband 111 may comprise fastening means 112, such as a clasp. The fastening means 112 may enable the user to securely attach the wristband 111 around his/her wrist and to adjust the size of the wristband 111.

In the example embodiment of FIG. 1, the computing unit 200A is integrated in the wrist apparatus 110A. The computing unit 200B is external to the wrist apparatuses 110A, 110B, yet communicatively connected (via a suitable wireless or wired communication connection) to the wrist apparatus 110A and/or 110B. An external computing unit 200B may be included in any suitable computing device, such as an external smart watch, a smartphone, a tablet computer, a laptop computer, a desktop computer, a server computer, a cloud computing device, or the like.

In the example embodiment of FIG. 1, the wrist apparatus 110A may comprise, e.g., a smart watch or the like. Accordingly, in the example embodiment 100A of FIG. 1, the computing unit 200A may be integrated in this smart watch.

The wrist apparatus 110A, 110B further comprises a group of at least two proximity sensors 300 that are mounted on an inner surface of the wristband 111. Each proximity sensor 300 is configured to detect its respective proximity to a surface of the wrist 120, 130 of a user wearing the wristband 111.

Figure 3:
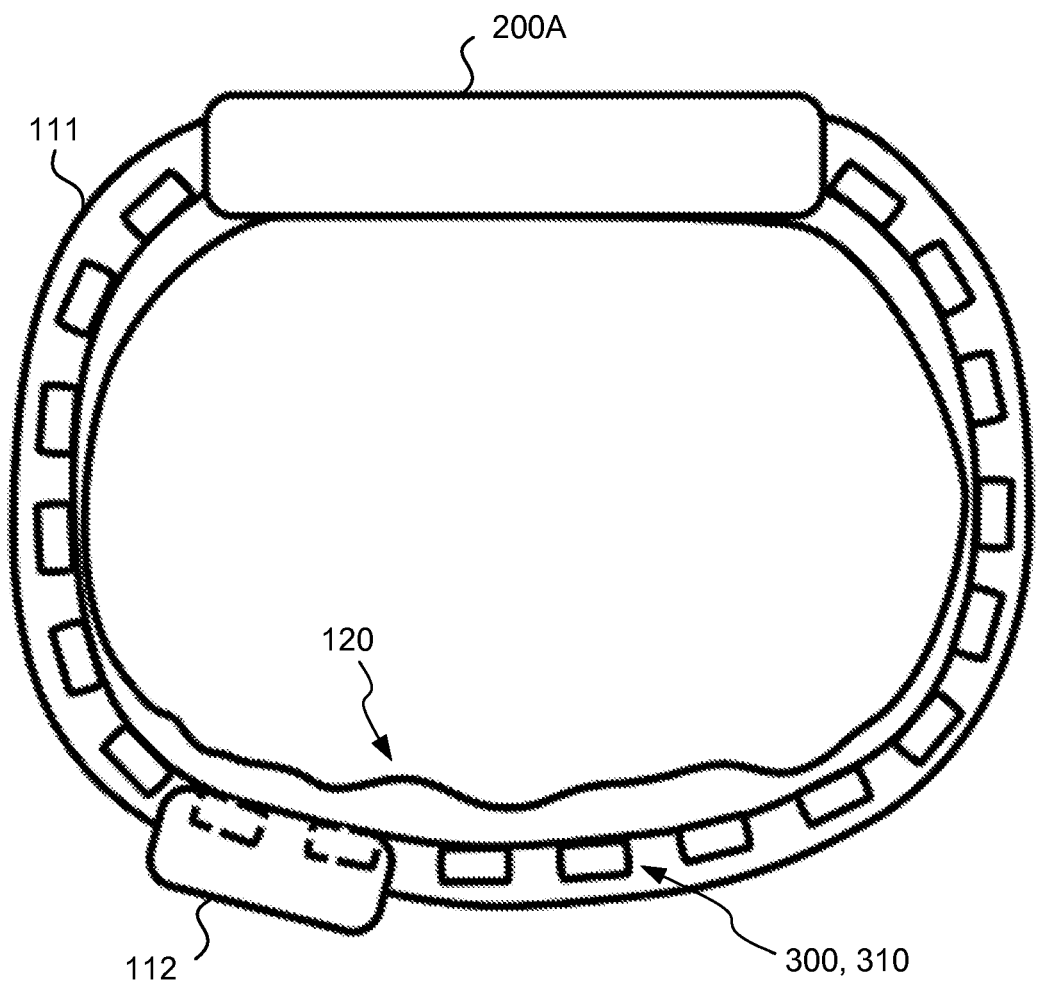
FIG. 3 shows an example embodiment of the subject matter described herein illustrating wrist apparatus with an integrated computing unit.

FIG. 3 illustrates the wrist apparatus 110A with the integrated computing unit 200A in more detail, as a cross-section of the wrist 120 and the surrounding wristband 111. As can be seen, the sensors 300 may be placed on the inside face or surface of the wristband 111 in order to measure the properties of interest from the wrist 120. These sensors 300 may be placed around the entire length of the wristband 111, e.g. to increase signal dimensions and consequently accuracy further down the line in a signal processing pipeline. It is to be understood that the wrist apparatus 110B may be similar to the example embodiment of FIG. 3 apart from the absence of the integrated computing unit 200A.

For example, the group of the at least two proximity sensors 300 may comprise one or more of: an infrared based proximity sensor, a laser based proximity sensor, an electronic image sensor based proximity sensor, an ultrasound based proximity sensor, a capacitive proximity sensor, a radar based proximity sensor, an accelerometer based proximity sensor, a piezoelectricity based proximity sensor, and/or a pressure based proximity sensor.

Figure 4:
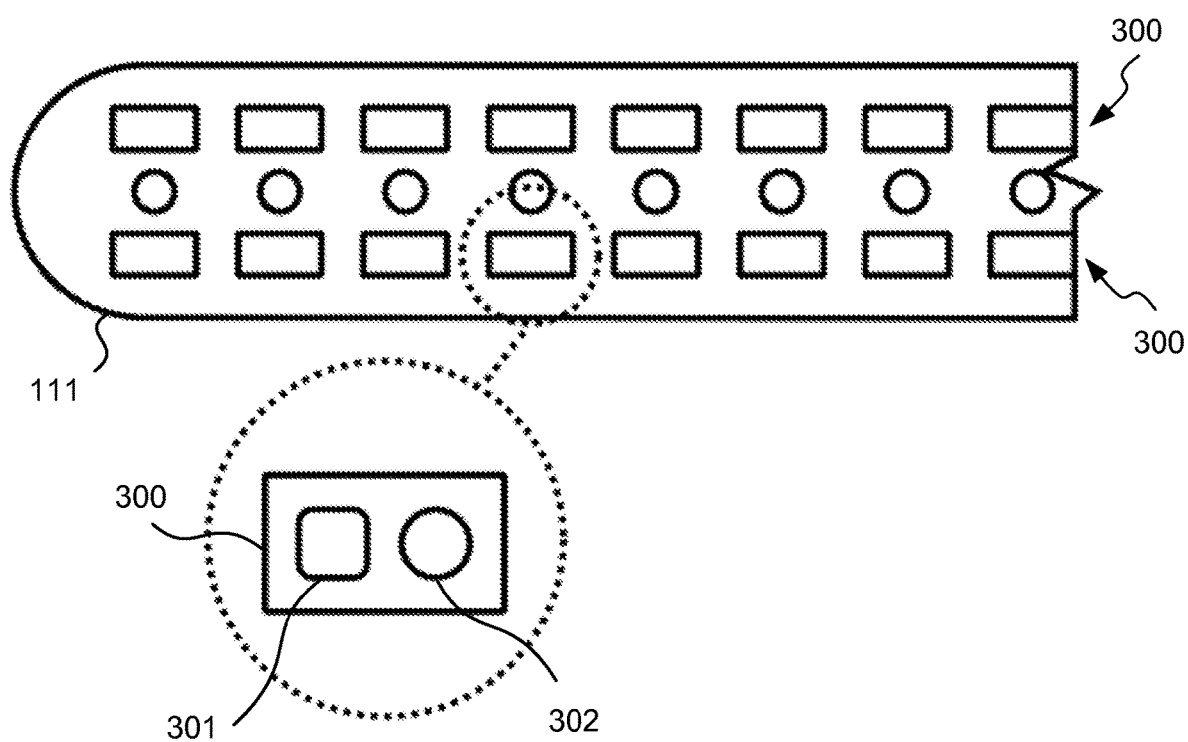
FIGS. 4 and 5 illustrate examples of an infrared light emitter and an infrared light receiver configured to measure the proximity of a wrist surface in front of them.
Figure 5:
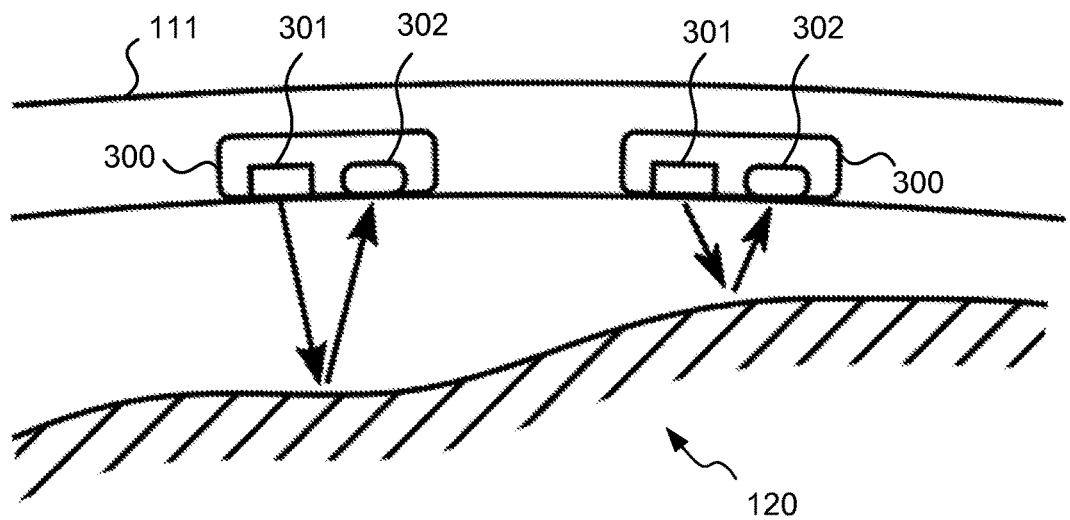

As an example, the infrared based proximity sensor may comprise a pair of an infrared light-emitting diode (LED) 301 acting as an infrared light emitter and a phototransistor 302 acting as an infrared light receiver 302, as shown in FIG. 4. As shown in FIG. 5, such an active infrared based proximity sensor may indirectly detect the distance to an object in front of it at close ranges within a few millimeters by shining a cone of infrared light forward with LED 301, and sensing how much light is reflected back with the phototransistor 302. In practice, the more light is reflected back, the more current the phototransistor 302 lets through. This property of the phototransistor 302 may be used in series with a resistor for example to create a voltage divider circuit that may be used to measure incident light on the phototransistor 302 with high accuracy. For example, the resolution of the measured proximity to the wrist skin may be as small as 0.1 millimeters.

In at least some embodiments, other sensor types may be used in addition to the infrared based proximity sensors, e.g., to increase the robustness and/or accuracy of the infrared based proximity sensors.

As will be discussed in more detail below, a neural network may be trained to perform the estimating of the force applied on the surface. Accordingly, the wrist apparatus 110A, 110B may further comprise one or more inertial measurement unit (IMU) sensors 310 mounted on the wristband 111 and configured to provide position information of the wristband 111 for the training of the neural network.

Figure 6:
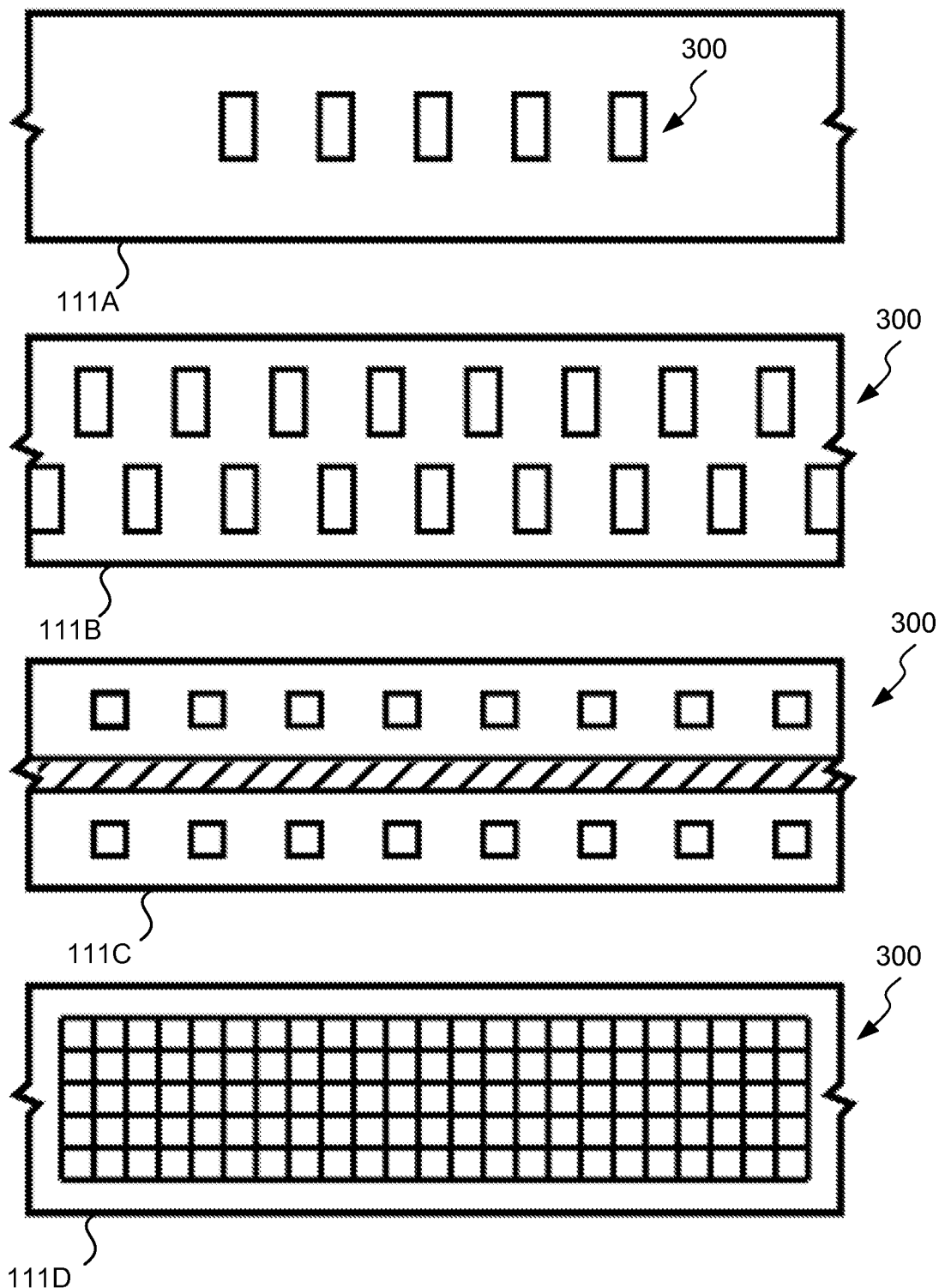
FIG. 6 illustrates various example sensor configurations.

For example, the group of the at least two proximity sensors 300 may comprise at least one row of the proximity sensors in the direction of the circumference of the inner surface of the wristband 111. FIG. 6 illustrates example wristbands 111A to 111D with various example sensor configurations. Wristband 111A comprises a single row of the proximity sensors 300, and wristband 111B comprises two rows of the proximity sensors 300, the two rows mounted such that they do not align with each other. Wristband 111C comprises three rows of the proximity sensors 300, the three rows mounted such that the middle row comprises light emitting elements (e.g. LEDs) and the two edge rows comprise light receiving elements (e.g. phototransistors). Wristband 111D comprises a matrix of the proximity sensors 300. At least the matrix configuration of wristband 111D allows obtaining high-density information about the wrist surface.

Figure 2A:
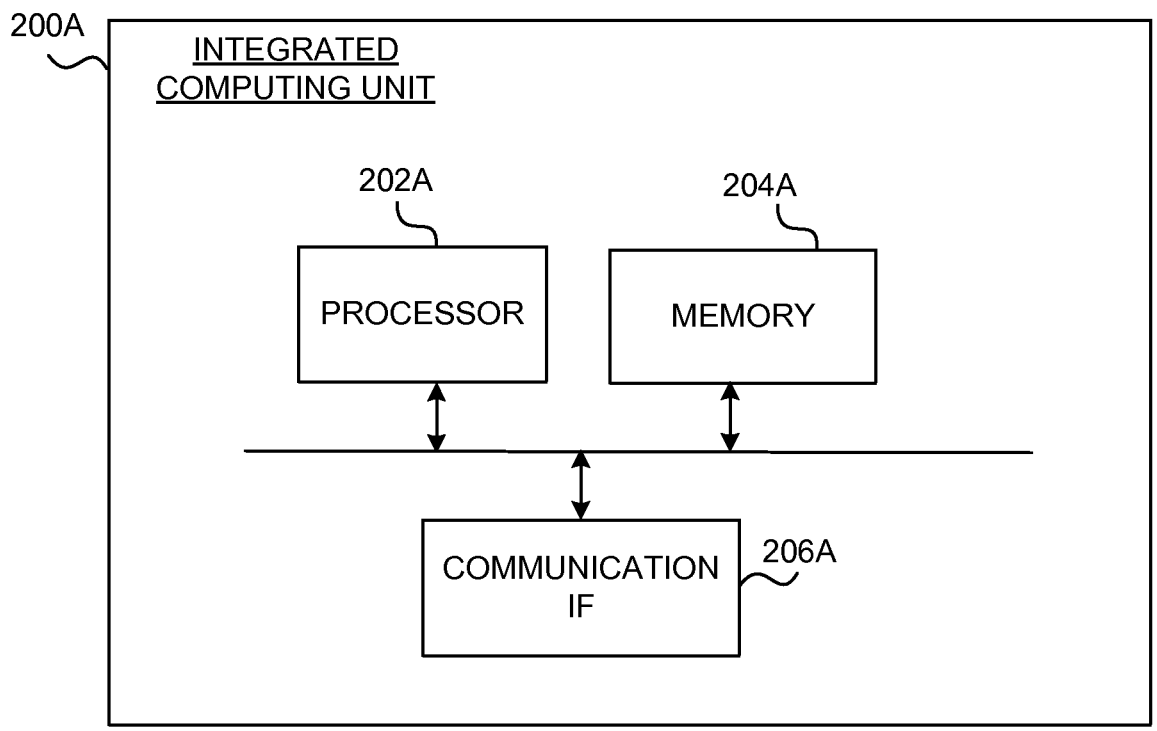
FIG. 2A shows an example embodiment of the subject matter described herein illustrating an integrated computing unit.

FIG. 2A is a block diagram of the integrated computing unit 200A, in accordance with an example embodiment.

The computing unit 200A comprises at least one processor 202A, and at least one memory 204A including computer program code. The computing unit 200A may further comprise a communication interface 206A, including e.g. a wireless and/or wired transceiver. The computing unit 200A may also include other elements not shown in FIG. 2A.

Although the computing unit 200A is depicted to include only one processor 202A, the computing unit 200A may include more processors. In an embodiment, the memory 204A is capable of storing instructions, such as an operating system and/or various applications. Furthermore, the memory 204A may include a storage that may be used to store, e.g., at least some of the information and data used in the disclosed embodiments.

Furthermore, the processor 202A is capable of executing the stored instructions. In an embodiment, the processor 202A may be embodied as a multi-core processor, a single core processor, or a combination of one or more multi-core processors and one or more single core processors. For example, the processor 202A may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202A may be configured to execute hard-coded functionality. In an embodiment, the processor 202A is embodied as an executor of software instructions, wherein the instructions may specifically configure the processor 202A to perform the algorithms and/or operations described herein when the instructions are executed.

The memory 204A may be embodied as one or more volatile memory devices, one or more non-volatile memory devices, and/or a combination of one or more volatile memory devices and non-volatile memory devices. For example, the memory 204A may be embodied as semiconductor memories (such as mask ROM, PROM (programmable ROM), EPROM (erasable PROM), flash ROM, RAM (random access memory), etc.).

The at least one memory 204A and the computer program code may be configured to, with the at least one processor 202A, cause the computing unit 200A to at least perform receiving the detected proximities from the group of the at least two proximity sensors 300. The proximity detection is discussed above in more detail in connection with FIG. 1 and FIGS. 3 to 6.

The at least one memory 204A and the computer program code are configured to, with the at least one processor 202A, cause the computing unit 200A to at least perform measuring changes in wrist surface topography based on the detected proximities.

The at least one memory 204A and the computer program code are further configured to, with the at least one processor 202A, cause the computing unit 200A to perform estimating a force applied on a surface by at least one finger associated with the wrist 120, 130 based on the measured changes in the wrist surface topography. As described in more detail below, in at least some embodiments, the force estimation may be performed by utilizing machine learning, such that machine learning related computer program code being run to estimate the force is pre-trained on a known dataset and labels.

Figure 7:
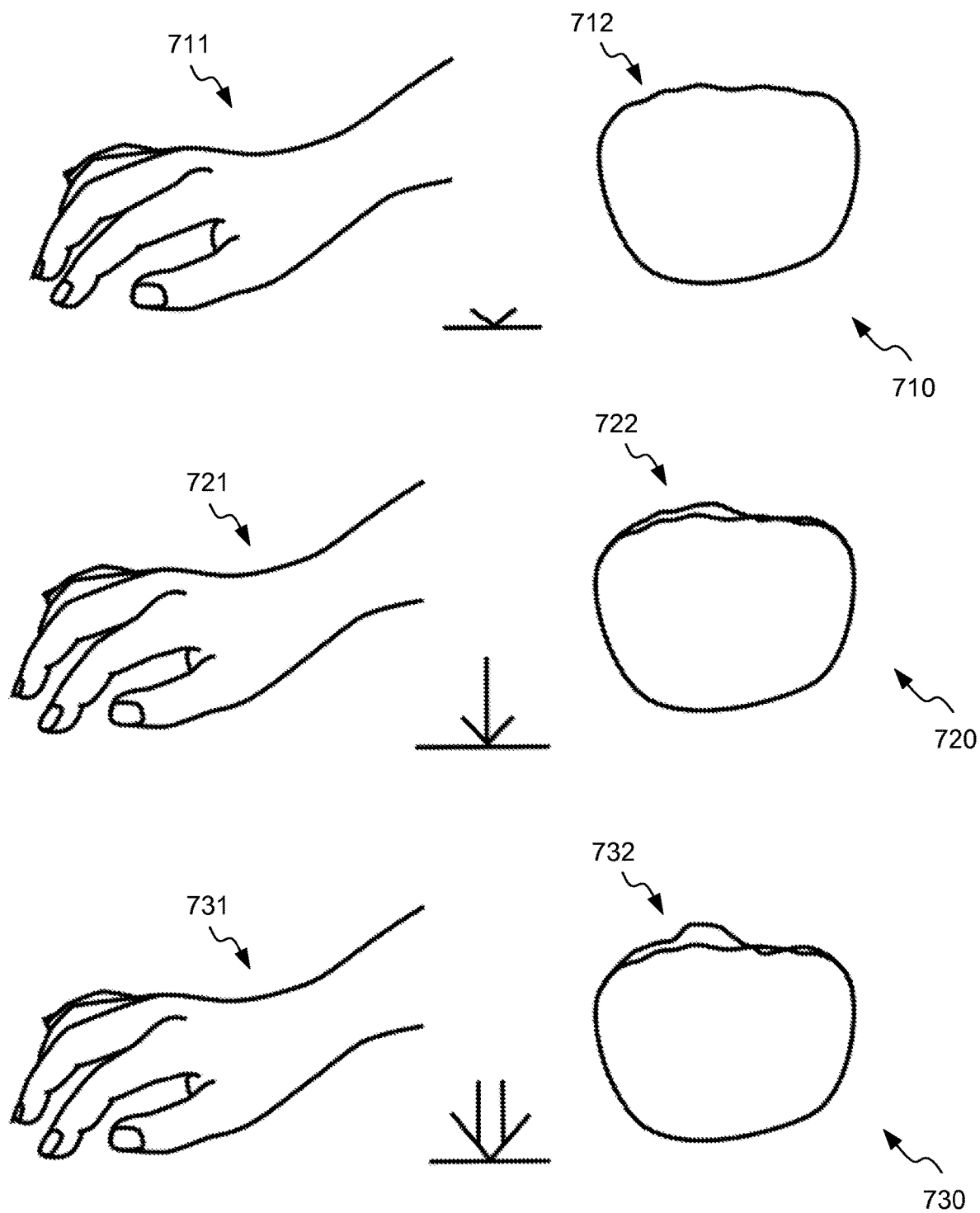
FIG. 7 illustrates examples of surface topography of a wrist changing in response to the amount of force applied by a finger.

FIG. 7 illustrates examples of surface topography of a wrist changing in response to the amount of force applied by a finger. As discussed above, depending on how hard one presses onto a surface (e.g., a table or the like) with an index finger, the wrist topography changes slightly. These changes may be measured with various sensors 300, such as the infrared based sensors. In diagram 710, the finger of hand 711 is resting against the surface, resulting in wrist topography or cross-sectional perimeter 712. In diagram 720, the finger of hand 721 is pressing against the surface, resulting in a changed wrist topography or cross-sectional perimeter 722. In diagram 730, the finger of hand 731 is pressing hard against the surface, resulting in a yet more changed wrist topography or cross-sectional perimeter 732.

The at least one memory 204A and the computer program code may be further configured to, with the at least one processor 202A, cause the computing unit 200A to perform outputting a force signal indicating the estimated force, e.g. to an external application and/or device.

In at least some embodiments, the computer program code may comprise a neural network trained to perform the estimating of the force applied on the surface. That is, the software used to estimate and/or predict the applied force may be based on machine learning (ML). To train an ML model, the wrist apparatus 110A, 100B may be used to collect input training data. A label collection system may be used to collect continuous force labels.

The force labels may be collected, e.g., by asking a user to press on a force sensitive multi-touchscreen with different prompts instructing the right number of fingers to be placed on certain locations. This tells the machine learning model the following information at any given time: force applied, and which finger applied the force. The user may also be asked to perform these force presses in conditions that are challenging for the model, such as when the wristband is moving, when the wristband is being pressed tightly to the skin, etc. Additionally, to decrease false positives, the user may be asked to pretend to press a surface without pressing one, by pressing in the air for example, in order to provide data for the model as to what counts as a real press on a real surface and what does not.

In at least some embodiments, a pre-trained ML model may be used together with user calibration. That is, in a setup stage, the neural network may first be pre-trained. Later, in real usage new users may be asked to perform a calibration sequence first, and then the pre-trained model may be used to infer force.

This means that when learning to infer for the first time in the setup stage, the neural network may first learn the unique wrist profile of each user so that when the ML model is used on a new user, it only needs to learn the wrist profile of this new user to then continue using the rest of the neural network as per originally trained. This learning of a new wrist profile may be done using a calibration sequence. This may be implemented, e.g., using transfer learning.

When detecting force, the wrist topography and measurements of it may change depending on how one holds one's hand, and how well the wristband sits on the wrist. To address this, when training the neural network, one or more additional IMU sensors 310 may be added to the wristband 111 along with the IR sensors. The IMU sensor 310 may provide information to the neural network about what position the wrist is in so that the neural network may learn to become robust against hand movements and wristband 111 movements.

In at least some embodiments, the group of the at least two proximity sensors 300 may comprise an infrared based proximity sensor, and the at least one memory 204A and the computer program code may be further configured to, with the at least one processor 202A, cause the computing unit 200A to perform adjusting brightness of an infrared light emitter of the infrared based proximity sensor and/or sensitivity of an infrared light receiver of the infrared based proximity sensor.

In other words, to increase the robustness of the neural network's inferences to wristband 111 position shifts, there may be an automatic adjustment to how bright the LEDs are, as well as how sensitive the phototransistors are, to keep them at an optimal sensing region. This is because due to various reasons, there may be times when the sensors are not at the optimal sensing distance to the user's wrist. E.g., the user may have put the wristband 111 on too tight, and thus the IR distance sensors may see too much light and can no longer measure signals related to distance, or even between different people of different wrist diameters. Thus, each wristband 111 may ideally need to be able to sense distance to the skin optimally in all cases. So, for example, the computing unit 200A may automatically try various LED brightnesses and phototransistor sensitivities during the user's calibration sequence in order to find a combination that maximizes the sensitivity of the sensor for that given band-placement/sensor-distance-to-the-skin. Alternatively, the adjusting may also happen in real-time during usage.

Figure 2B:
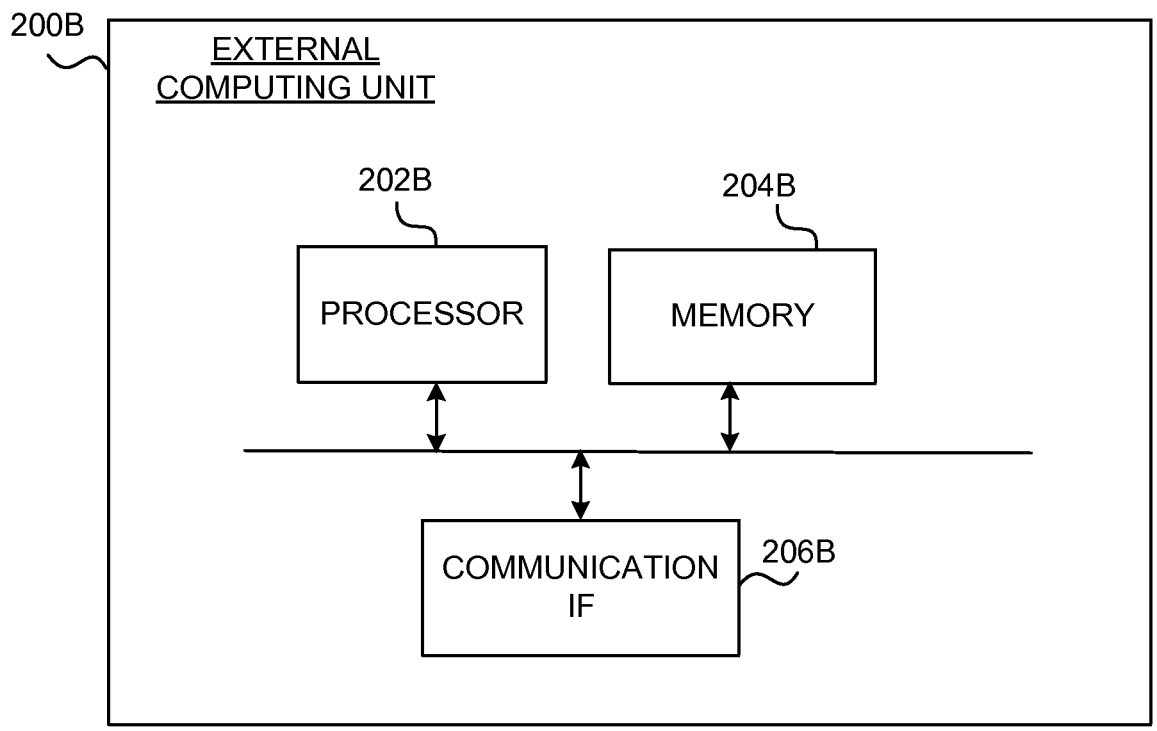
FIG. 2B shows an example embodiment of the subject matter described herein illustrating an external computing unit.

FIG. 2B is a block diagram of the external computing unit 200B, in accordance with an example embodiment. The computing unit 200B comprises at least one processor 202B, and at least one memory 204B including computer program code. The computing unit 200B may further comprise a communication interface 206B, including e.g. a wireless and/or wired transceiver. The computing unit 200B may also include other elements not shown in FIG. 2B. Further features of the external computing unit 200B directly result from the functionalities and parameters of the systems 100A, 100B and the integrated computing unit 200A, and thus are not repeated here.

Figure 8:
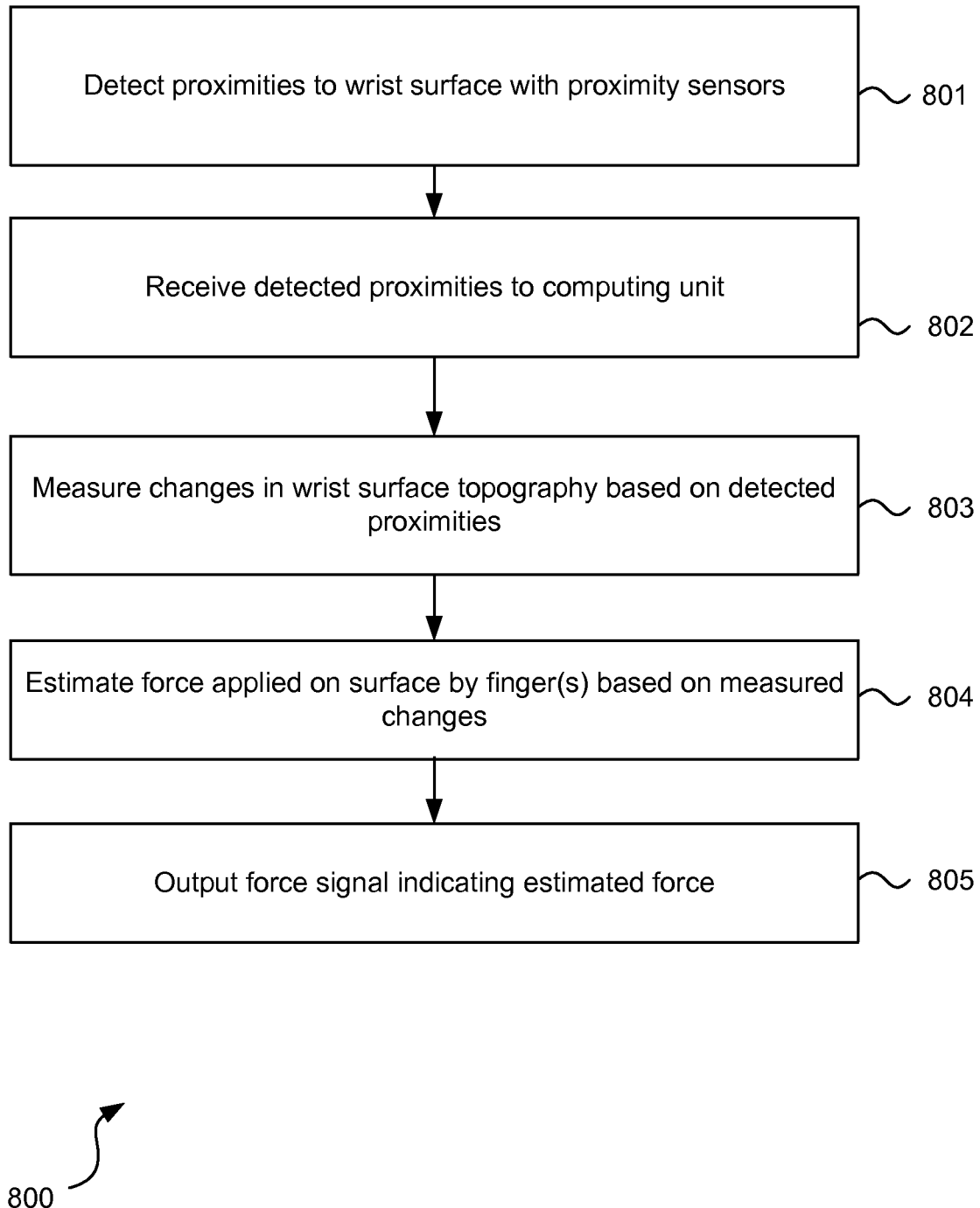
FIG. 8 shows an example embodiment of the subject matter described herein illustrating a method.

FIG. 8 illustrates an example flow chart of a method 800, in accordance with an example embodiment.

At optional operation 801, proximities of the group of the at least two proximity sensors 300 mounted on the inner surface of the wristband 111 of the wrist apparatus 110A, 110B communicatively connected to the computing unit 200A and/or 200B are detected by the sensors 300.

At optional operation 802, the detected proximities are received at the computing unit 200A and/or 200B.

At operation 803, changes in wrist surface topography are measured by the computing unit 200A and/or 200B based on the detected proximities.

At operation 804, a force applied on a surface by at least one finger associated with the wrist 120, 130 is estimated by the computing unit 200A and/or 200B based on the measured changes in the wrist surface topography.

At optional operation 805, a force signal indicating the estimated force is output by the computing unit 200A and/or 200B.

The method of diagram 800 may be performed by the systems 100A and/or 100B of FIG. 1 and by the computing units 200A and/or 200B of FIGS. 2A and 2B. The operation 801 can, for example, be performed by the group of the at least two proximity sensors 300. The operations 802 to 805 can, for example, be performed by the at least one processor 202A, 202B and the at least one memory 204A, 204B. Further features of the method 800 directly result from the functionalities and parameters of the systems 100A, 100B and the computing units 200A, 200B, and thus are not repeated here. At least parts of the method 800 can be performed by computer program (s).

At least some of the embodiments described herein may allow estimating force from wrist-based signals based on detecting the changes in wrist surface topography as a user applies a force with their fingers.

At least some of the embodiments described herein may allow making a surface into a user interface by putting the sensing elements on the user instead of on the objects being used (such as traditional physical buttons). Specifically, the sensing elements are placed on the user's wrist so that the user's hands are free to act without obstruction. In combination with other technologies such as heads-up displays with object recognition capabilities, this allows new user interfaces to be mapped to a surface that the user comes in contact with using their hands and fingers, thus turning the surface into a dynamic user interface.

At least some of the embodiments described herein may allow an alternative approach to detection of force being applied on a surface by fingers that may eliminate some or all of the drawbacks associated, e.g. with using EMG in force detection.

At least some of the embodiments described herein may allow a finger-force sensing device placed on the wrist that is able to detect the force being applied at the fingertip. This results in the user's hand not being obstructed to carry out, e.g., everyday life activities. This further results in the user being able to use any surface as a force sensitive surface for interactable items.

The functionality described herein can be performed, at least in part, by one or more computer program product components such as software components. According to an embodiment, the computing unit 200 may comprise a processor configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUS).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A system comprising a wrist apparatus and a computing unit communicatively connected to the wrist apparatus, the wrist apparatus comprising:
   a wristband; and
   a group of at least two proximity sensors mounted at a sensing distance from a surface of a wrist of a user wearing the wristband on an inner surface of the wristband, and configured to detect a proximity distance of each proximity sensor to the surface of the wrist of the user wearing the wristband, and
   the computing unit comprising:
   at least one processor; and
   at least one memory including computer program code;
   wherein the at least one memory and the computer program code are configured to, with the at least one processor, cause the computing unit to at least perform:
   measuring surface changes in wrist surface topography based on the detected proximity distances; and
   estimating a force applied on a surface by at least one finger associated with the wrist based on the measured surface changes in the wrist surface topography.

2. The system according to claim 1, wherein the group of the at least two proximity sensors comprises at least one row of the proximity sensors in the direction of the circumference of the inner surface of the wristband.

3. The system according to claim 1, wherein the group of the at least two proximity sensors comprises one or more of: an infrared based proximity sensor, a laser based proximity sensor, an electronic image sensor based proximity sensor, an ultrasound based proximity sensor, a capacitive proximity sensor, a radar based proximity sensor, an accelerometer based proximity sensor, a piezoelectricity based proximity sensor, or a pressure based proximity sensor.

4. The system according to claim 3, wherein the infrared based proximity sensor comprises a pair of an infrared light-emitting diode acting as an infrared light emitter and a phototransistor acting as an infrared light receiver.

5. The system according to claim 1, wherein the at least one memory and the computer program code are further configured to, with the at least one processor, cause the computing unit to perform outputting a force signal indicating the estimated force.

6. The system according to claim 1, wherein the computer program code comprises a neural network trained to perform the estimating of the force applied on the surface.

7. The system according to claim 6, wherein the wrist apparatus further comprises one or more inertial measurement unit sensors mounted on the wristband, configured to provide position information of the wristband for the training of the neural network.

8. The system according to claim 1, wherein the group of the at least two proximity sensors comprises an infrared based proximity sensor, and the at least one memory and the computer program code are further configured to, with the at least one processor, cause the computing unit to perform adjusting at least one of brightness of an infrared light emitter of the infrared based proximity sensor or sensitivity of an infrared light receiver of the infrared based proximity sensor.

9. The system according to claim 1, wherein the computing unit is integrated in the wrist apparatus.

10. The system according to claim 9, wherein the wrist apparatus comprises a smart watch.

11. The system according to claim 1, wherein the computing unit is external to the wrist apparatus.

12. A computing unit, comprising:
   at least one processor; and
   at least one memory including computer program code;
   the at least one memory and the computer program code configured to, with the at least one processor, cause the computing unit to at least perform:
   receiving, from a group of at least two proximity sensors mounted at a sensing distance from a surface of a wrist of a user wearing a wristband on an inner surface of the wristband of a wrist apparatus communicatively connected to the computing unit, a detected proximity distance of each proximity sensor to the surface of the wrist of the user wearing the wristband;
   wherein the at least one memory and the computer program code are further configured to, with the at least one processor, cause the computing unit to at least perform:
   measuring surface changes in wrist surface topography based on the detected proximity distances; and
   estimating a force applied on a surface by at least one finger associated with the wrist based on the measured surface changes in the wrist surface topography.

13. A method, comprising:
   receiving, at a computing unit from a group of at least two proximity sensors mounted at a sensing distance from a surface of a wrist of a user wearing a wristband on an inner surface of the wristband of a wrist apparatus communicatively connected to the computing unit, a detected proximity distance of each proximity sensor to the surface of the wrist of the user wearing the wristband;

measuring, by the computing unit, surface changes in wrist surface topography based on the detected proximity distances; and estimating, by the computing unit, a force applied on a surface by at least one finger associated with the wrist based on the measured surface changes in the wrist surface topography.

14. A non-transitory computer readable medium comprising computer program instructions for causing a processor to perform at least the following:

receiving, at a computing unit from a group of at least two proximity sensors mounted at a sensing distance from a surface of a wrist of a user wearing a wristband on an inner surface of the wristband of a wrist apparatus communicatively connected to the computing unit, a detected proximity distance of each proximity sensor to the surface of the wrist of the user wearing the wristband;

wherein the non-transitory computer readable medium further comprises computer program instructions for causing the processor to perform at least the following:

measuring surface changes in wrist surface topography based on the detected proximity distances; and estimating a force applied on a surface by at least one finger associated with the wrist based on the measured surface changes in the wrist surface topography.

* * * * *